(No Model.)

P. E. BUDLONG.
NUT LOCK.

No. 578,717.  Patented Mar. 16, 1897.

WITNESSES
John Buckler
C Gerst

INVENTOR
Percy E. Budlong
BY
Edgar Tate & Co
ATTORNEYS

UNITED STATES PATENT OFFICE.

PERCY E. BUDLONG, OF WASHINGTON, DISTRICT OF COLUMBIA.

NUT-LOCK.

SPECIFICATION forming part of Letters Patent No. 578,717, dated March 16, 1897.

Application filed May 12, 1896. Serial No. 591,280. (No model.)

*To all whom it may concern:*

Be it known that I, PERCY E. BUDLONG, a citizen of the United States, and a resident of Washington, in the District of Columbia, have invented certain new and useful Improvements in Nut-Locks, of which the following is a specification, reference being had to the accompanying drawings, forming a part thereof, in which similar letters of reference indicate corresponding parts.

This invention relates to nut-locks for carriages, trucks, and other vehicles; and the object thereof is to provide means for securing the spindle-nut in such vehicles in place, so that the wheel cannot come off in the operation thereof.

The invention is fully disclosed in the following specification, of which the accompanying drawings form a part, in which—

Figure 1:
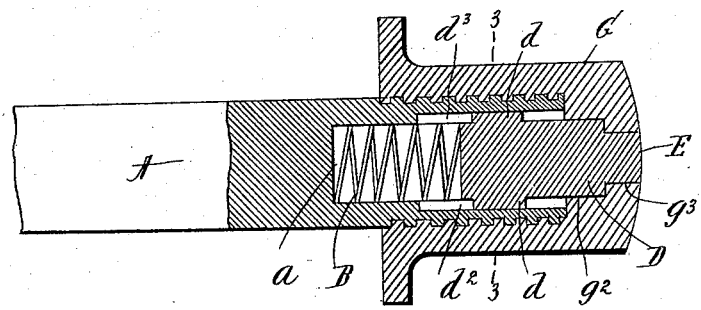
Figure 2:
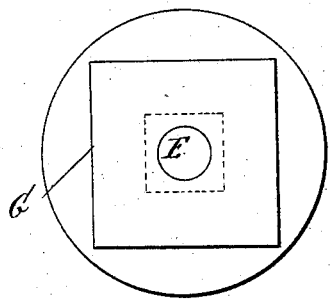
Figure 3:
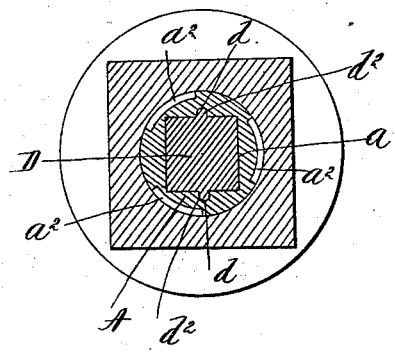

Figure 1 is a side view of the end of a vehicle-spindle, showing a nut provided with my improvement, and the end of the spindle and the nut being shown in section; Fig. 2, an end view thereof, and Fig. 3 a transverse section on the line 3 3 of Fig. 1.

In the drawings forming part of this specification, A represents the end of a spindle of a carriage or other vehicle, and in the practice of my invention I form therein a longitudinal chamber or cavity $a$, which is preferably square in form, and in which is mounted a spiral spring B. Mounted in the chamber or cavity $a$, and adapted to slide therein, is a plug D, which is also square in cross-section, and which is provided at its opposite sides with longitudinal beads or projections $d$, which are adapted to slide in grooves $d^2$, formed in the opposite sides of the chamber $a$, and the plug D is provided at its outer end with a cylindrical extension F.

The outer end of the spindle A is screw-threaded, so as to receive a nut G, but in my improvement the screw-thread on the spindle A does not extend entirely around the same, there being a plurality of vacant longitudinal spaces $a^2$, three of which are preferably employed, and the screw-thread in the nut G is formed in the same manner, there being three longitudinal spaces which correspond with those formed in the end of the spindle, and the outer end of the nut G is provided with a chamber or receptacle $g^2$, which corresponds in form with the end of the plug D and also with a circular passage or opening $g^3$, through which the end E of the plug is adapted to pass, and the operation will be readily understood from the foregoing description when taken in connection with the accompanying drawings and the following statement thereof.

In order to connect the nut G with the spindle, it is only necessary to slide the same thereon, but in this operation the screw-threads in the nut pass between those formed on the spindle, and in this operation the plug D is forced inwardly until the beads or projections $d$ strike the walls at the inner end of the grooves $d^2$, and then by giving the nut G a partial curve the outer end of the plug will be forced into the chamber $g^2$, which corresponds in form with the end of the plug, and the cylindrical extension E of the plug will pass through the corresponding opening $g^3$ in the end of the nut, and when the plug is in this position the nut cannot be turned, and consequently will not or cannot work off in the operation of the vehicle.

It will be understood that the spring B operates or forces the plug outwardly at all times and holds it in the desired position, and whenever it is necessary to remove the wheel the plug D must be forced inwardly until the outer end thereof is free from the corresponding chamber or recess $g^2$ in the nut, after which the nut may be given a partial turn and taken off.

This device is simple in construction and operation and perfectly adapted to accomplish the result for which it is intended; and it is evident that changes in and modifications of the construction herein described may be made without departing from the spirit of my invention or sacrificing its advantages.

It will be apparent that my improved nut-lock may be used in connection with rods or bolts wherever such devices are required, as well as on the spindles of vehicles; and Having fully described my invention, I claim as new and desire to secure by Letters Patent—

1. The combination with the end of a spindle, of a vehicle, or other article, which is provided with a longitudinal cavity or chamber, and a screw-thread, and said screw-thread being provided with longitudinal open spaces, of a nut which is similarly threaded and provided with longitudinal unthreaded spaces, and a spring-operated plug, which is mounted in, and adapted to slide in said cavity or chamber, the outer end of said plug being angular in cross-section, and adapted to enter a corresponding chamber or cavity, formed in the nut, and being also provided with a cylindrical extension which passes through a circular opening formed in the nut, said chamber or cavity in the spindle and said plug being both angular in cross-section, and means for limiting the inward movement of the plug, consisting of ribs or projections formed thereon, and adapted to move in grooves formed in the walls of said chamber or cavity, substantially as shown and described.

2. The combination with a spindle or bolt the end of which is exteriorly screw-threaded and provided with longitudinal unthreaded portions $a^2$, said screw-threaded ends being also provided with a bore in the outer portion of which are formed slots or grooves, of a plug D mounted in said bore and provided with ribs or projections $d$ adapted to engage said slots or grooves in bore of the spindle, a spiral spring mounted in said bore and adapted to force said plug outwardly, and a nut having a screw-threaded bore provided with longitudinal unthreaded portions, said bore being diminished in diameter beyond the screw-threaded portion to form steps or shoulders adapted to correspond with the forward end of said plug, whereby, when the nut is secured in position said plug prevents the rotation of the same in the manner set forth.

In testimony that I claim the foregoing as my invention I have signed my name, in presence of the subscribing witnesses, this 8th day of May, 1896.

PERCY E. BUDLONG.

Witnesses:
WM. HERBERT SMITH,
J. W. HULSE.